United States Patent
Chang et al.

(10) Patent No.: US 11,182,830 B2
(45) Date of Patent: Nov. 23, 2021

(54) DIGITAL ADVERTISING BIDDING METHOD, DIGITAL ADVERTISING BIDDING SYSTEM, TOKEN GENERATING SERVER, DATA MANAGEMENT SERVER AND CAMPAIGN MANAGEMENT METHOD

(71) Applicant: Groundhog Inc., Taipei (TW)

(72) Inventors: Hsiao-Tse Chang, Taipei (TW); Wei Chen, Taipei (TW)

(73) Assignee: Groundhog Inc., Taipei (TW)

( * ) Notice: Subject to any disclaimer, the term of this patent is extended or adjusted under 35 U.S.C. 154(b) by 985 days.

(21) Appl. No.: 15/210,865

(22) Filed: Jul. 14, 2016

(65) Prior Publication Data
US 2018/0018710 A1 Jan. 18, 2018

(51) Int. Cl.
G06Q 30/02 (2012.01)
G06F 21/62 (2013.01)
G06Q 50/00 (2012.01)

(52) U.S. Cl.
CPC ..... G06Q 30/0275 (2013.01); G06F 21/6245 (2013.01); G06Q 30/0269 (2013.01); G06Q 30/0277 (2013.01); G06Q 50/01 (2013.01)

(58) Field of Classification Search
None
See application file for complete search history.

(56) References Cited

U.S. PATENT DOCUMENTS

| | | | | |
|---|---|---|---|---|
| 2009/0132559 | A1* | 5/2009 | Chamberlain | G06Q 30/02 |
| 2010/0228597 | A1* | 9/2010 | Das | G06Q 30/02 705/14.71 |
| 2012/0323674 | A1* | 12/2012 | Simmons | G06Q 30/0249 705/14.41 |
| 2013/0124309 | A1* | 5/2013 | Traasdahl | H04L 67/22 705/14.49 |

(Continued)

FOREIGN PATENT DOCUMENTS

KR 20180013254 A * 2/2018

OTHER PUBLICATIONS

"OpenRTB API Specification Version 2.3", Final Draft, Nov. 2014, IAB Advertising Technology Council, https://www.iab.com/wp-content/uploads/2015/06/OpenRTB-API-Specification-Version-2-3.pdf (Year: 2014).*

(Continued)

*Primary Examiner* — Kambiz Abdi
*Assistant Examiner* — Scott Snider
(74) *Attorney, Agent, or Firm* — JCIPRNET

(57) ABSTRACT

A digital advertising bidding method and a digital advertising bidding system are provided. The digital advertising bidding method includes receiving an ad request with an identifier by a token generating server; encrypting the identifier to generate a token corresponding to the ad request to replace the identifier by the token generating server; transmitting the token and a corresponding bid request to a demand side server by the token generating server; transmitting the token and the identifier to a data management (Continued)

server by the token generating server; requesting a targeting information corresponding to the token from the data management server by the demand side server; and transmitting the targeting information to the demand side server by the data management server.

10 Claims, 4 Drawing Sheets

(56) References Cited

U.S. PATENT DOCUMENTS

| | | | |
|---|---|---|---|
| 2015/0006885 A1* | 1/2015 | Arya | H04L 63/0428 713/156 |
| 2015/0025977 A1* | 1/2015 | Doyle | G06Q 30/0282 705/14.66 |
| 2016/0359632 A1* | 12/2016 | Mohajeri | H04L 9/0872 |
| 2017/0099525 A1* | 4/2017 | Ray | H04N 21/4532 |
| 2017/0132431 A1* | 5/2017 | Gonzalez Blanco | G06F 21/6254 |
| 2017/0337589 A1* | 11/2017 | Yu | G06Q 30/02 |

OTHER PUBLICATIONS

Acharyya, Sandip; RevX Blog, "Fragmentation of IDs and its Impacton DigitalAdvertising", Aug. 24, 2015, https://revx.io/blog/fragmentation-of-ids-and-its-impact-on-digital-advertising/ (Year: 2015).*

Amazon Web Services, "Building a Real-Time Bidding Platform on AWS", Feb. 2016, https://d0.awsstatic.com/whitepapers/Building_a_Real_Time_Bidding_Platform_on_AWS_v1_Final.pdf(Year: 2016).*

"Search Report of Europe Counterpart Application", dated Nov. 3, 2017, p. 1-p. 8.

* cited by examiner

DIGITAL ADVERTISING BIDDING METHOD, DIGITAL ADVERTISING BIDDING SYSTEM, TOKEN GENERATING SERVER, DATA MANAGEMENT SERVER AND CAMPAIGN MANAGEMENT METHOD

BACKGROUND OF THE INVENTION

1. Field of the Invention

The present invention relates to a digital advertising bidding method, a digital advertising bidding system, a token generating server, a data management server and a campaign management method that acquire a better targeting accuracy by utilizing encrypted subscriber information without raising a privacy issue.

2. Description of Related Art

Digital advertising, also called online marketing or internet advertising or web advertising or online advertising, is a form of marketing and advertising which uses the Internet to deliver promotional marketing messages to consumers. In recent years, digital advertising has already changed the way of interaction between the companies and their clients, and it brings significant impact when the consumers make the purchasing decisions. More and more consumers use the social media to do research on internet to carry out preliminary product and price research before making final decisions. Digital advertising enables those companies to build relations with customers and prospects through regular, low-cost personalized communication, thus reflecting the move away from mass marketing.

However, the nature of online activity incurs the privacy problems we already experience in the internet world. Every operation we make on our PCs, smartphones, and tablets turns into a data point that trackers can easily collect and share. Consumers are forced to agree to such collecting and sharing whenever they sign up for an online service and accept its privacy policy. Therefore, it is the goal of person of skilled in the art to acquire a better targeting accuracy of online bidding by utilizing subscriber information while protecting end users from privacy abuse.

SUMMARY OF THE INVENTION

The present invention provides a digital advertising bidding method, a digital advertising bidding system, a token generating server, a data management server and a campaign management method that acquires a better targeting accuracy of online bidding by utilizing subscriber information from the communication service providers while protecting end users from privacy abuse.

One exemplary embodiment of the present invention provides a digital advertising bidding method comprising: receiving an ad request with an identifier by an token generating server; encrypting the identifier to generate a token corresponding to the ad request to replace the identifier by the token generating server; transmitting the token and a corresponding bid request to a demand side server by the token generating server; transmitting the token and the identifier to a data management server by the token generating server; requesting a targeting information corresponding to the token from the data management server by the demand side server; and transmitting the targeting information to the demand side server by the data management server.

In an exemplary embodiment of the present invention, the digital advertising bidding method further comprising: transmitting a bid response correlated with the targeting information to the token generating server by the demand side server; determining whether the demand side server is a highest bidder by the token generating server; and transmitting a winning information to an ad space which transmits the ad request by the token generating server if the demand side server is the highest bidder.

In an exemplary embodiment of the present invention, the digital advertising bidding method further comprising: requesting an advertisement creative from the demand side server by the ad space; and transmitting the advertisement creative to the ad space by the demand side server.

In an exemplary embodiment of the present invention, wherein the token is a one-time token generated by performing a one-way hashing algorithm on the identifier and a dynamic information.

In an exemplary embodiment of the present invention, wherein the dynamic information comprises a system time information, or a random generated information.

In an exemplary embodiment of the present invention, wherein the identifier comprises an international mobile equipment identity, an android advertising ID, an apple identifier for advertising, a MAC address, an IP address, or a cookie information ID.

One exemplary embodiment of the present invention provides a digital advertising bidding system comprising: an token generating server; a demand side server coupled to the token generating server; and a data management server coupled to the demand side server and the data management server, wherein the token generating server receives an ad request with an identifier, wherein the token generating server encrypts the identifier to generate a token corresponding to the ad request to replace the identifier, wherein the token generating server transmits the token and a corresponding bid request to the demand side server, wherein the token generating server transmits the token and the identifier to a data management server, wherein the demand side server requests a targeting information corresponding to the token from the data management server, wherein the data management server transmits the targeting info illation to the demand side server.

In an exemplary embodiment of the present invention, wherein the demand side server transmits a bid response correlated with the targeting information to the token generating server, wherein the token generating server determines whether the demand side server is a highest bidder, wherein the token generating server transmits a winning information to an ad space which transmits the ad request if the demand side server is the highest bidder.

In an exemplary embodiment of the present invention, wherein the ad space requests an advertisement creative from the demand side server, wherein the demand side server transmits the advertisement creative to the ad space.

In an exemplary embodiment of the present invention, wherein the token is a one-time token generated by performing a one-way hashing algorithm on the identifier and a dynamic information.

In an exemplary embodiment of the present invention, wherein the dynamic information comprises a system time information.

In an exemplary embodiment of the present invention, wherein the identifier comprises an international mobile equipment identity, an android advertising ID, an apple identifier for advertising, an MAC address, an IP address or a cookie information ID.

One exemplary embodiment of the present invention provides a token generating server comprising a processor and a communication chip coupled to the processor, wherein the communication chip receives an ad request with an identifier, wherein the processor encrypts the identifier to generate a token corresponding to the ad request to replace the identifier, wherein the communication chip transmits the token and a corresponding bid request to a demand side server, wherein the communication chip transmits the token and the identifier to a data management server, wherein the communication chip receives a bid response correlated with a targeting information from the demand side server, wherein the processor determines whether the demand side server is a highest bidder, and the communication chip transmits a winning information to an ad space which transmits the ad request if the demand side server is the highest bidder.

In an exemplary embodiment of the present invention, wherein the token is a one-time token generated by performing a one-way hashing algorithm on the identifier and a dynamic information.

In an exemplary embodiment of the present invention, wherein the dynamic information comprises a system time information or a random generated information.

In an exemplary embodiment of the present invention, wherein the identifier comprises an international mobile equipment identity, an android advertising ID, an apple identifier for advertising, a MAC address, an IP address, or a cookie information ID.

One exemplary embodiment of the present invention provides a data management server comprising a processor and a communication chip coupled to the processor, wherein the communication chip receives an encoded identifier from a campaign runner server, wherein the processor acquires a campaign list corresponding to the encoded identifier through a matching module, wherein the communication chip transmits the campaign list to the campaign runner server.

In an exemplary embodiment of the present invention, wherein the communication chip receives a plurality of campaign criterias from a campaign runner server, wherein the processor matches the campaign criterias with a plurality of identifiers, wherein the processor encodes the identifiers to generate the corresponding encoded identifiers.

One exemplary embodiment of the present invention provides a campaign management method, comprising: receiving an encoded identifier from a campaign runner server; acquiring a campaign list corresponding to the encoded identifier through a matching module; and transmitting the campaign list to the campaign runner server.

In an exemplary embodiment of the present invention, the campaign management method further comprising: receiving a plurality of campaign criterias from a campaign runner server; matching the campaign criterias with a plurality of identifiers; and encoding the identifiers to generate the corresponding encoded identifiers.

Accordingly, the present invention is directed to a digital advertising bidding method, a digital advertising bidding system and a token generating server that employ a tokenized bid request to obtain targeting information from the data management server such that a better targeting accuracy of online bidding is achieved without exposing any subscriber information to the demand side server. Furthermore, the data management server may also be implemented to perform the targeting campaign which returns a campaign list corresponding to an encoded identifier to a campaign runner server without exposing subscriber information.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
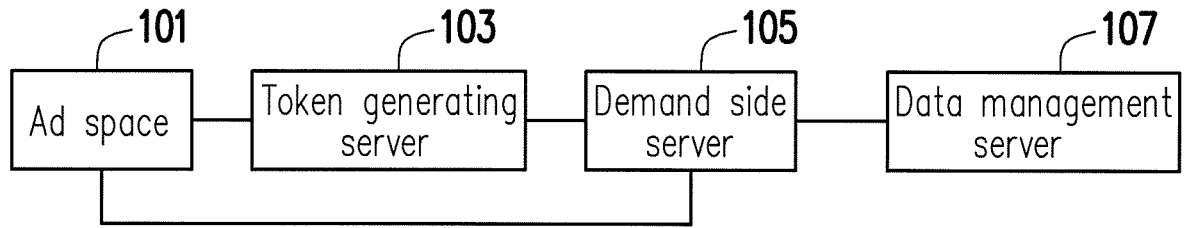
FIG. 1 is a block diagram illustrating a digital advertising bidding system according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram illustrating a digital advertising bidding system according to an exemplary embodiment of the present invention.

Referring to FIG. 1, the digital advertising bidding system 100 includes an ad space 101, a token generating server 103, a demand side server 105 and a data management server 107. The token generating server 103 couples to the ad space 101 and the demand side server 105, and the demand side server 105 couples to the data management server 107 and the ad space 101.

Generally speaking, the ad space 101 may be an area of an APP, website or web page dedicated to online advertisements, such as ad network or a supply side platform (SSP). This space is critical for organizations and APP or websites driven by advertising revenue. Ad space 101 pricing is generally determined according to ad format, placement and website traffic.

The token generating server 103 may be an ad exchange, a SSP or an ad network. The ad exchange may be a technology platform that facilitates the buying and selling of media advertising inventory from multiple ad networks. The SSP may be a technology platform to enable web publishers to manage their advertising space inventory, fill it with ads, and receive revenue. The ad network may be a platform that connects advertisers to web sites that want to host advertisements. If the token generating server 103 is a SSP or an ad network, the token generating server 103 may send a request information to the demand side server 105 through an ad exchange. Alternatively, if the token generating server 103 is an ad exchange, the token generating server 103 may directly send the request information to the demand side server 105.

The demand side server 105 may be a server that provides a platform for buyers of digital advertising inventory to manage multiple ad exchange and data exchange accounts through one interface. Real-time bidding for displaying online advertising takes place within the token generating servers, and by utilizing a demand side server, marketers may manage their bids for the banners and the pricing for the data that they are layering on to target their audiences. It is worth noting that a token generating server 103 may couple to a plurality of demand side servers, and a demand side server 105 may couple to a plurality of token generating servers, to accomplish a bid request and a corresponding bid response.

The data management server 107 may be a communication server provider (CSP) which includes interne service providers (ISP), telecom operators, and video on demand (VOD) operators. That is, the communication service provider is a service provider that transports information electronically and keeps subscriber information. The communication service provider encompasses public and private companies in the telecom, Internet, cable satellite and managed services businesses. The market in which a communication service provider specializes is often a function of the industry served. These industries can be divided into three categories of telecommunications, entertainment and media, and Internet/Web services. Some communication service providers have branched into multiple areas. Others provide communication services across all major categories.

Figure 2:
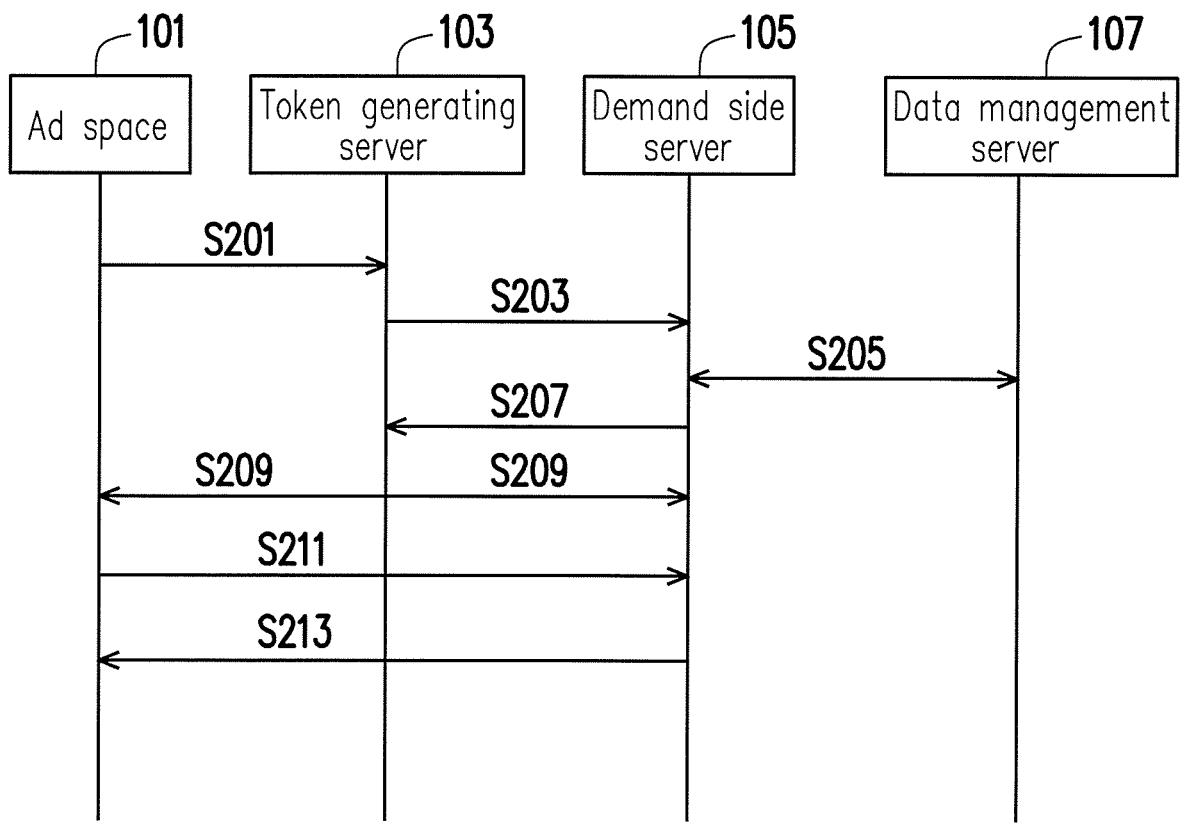
FIG. 2 is a flowchart illustrating a digital advertising bidding method according to an exemplary embodiment of the present invention.

FIG. 2 is a flowchart illustrating a digital advertising bidding method according to an exemplary embodiment of the present invention.

Referring to FIG. 2, in step S201, a user may have the ad space 101 transmit an ad request with an identifier to the token generating server 103 by utilizing an APP or a web browser. The identifier may include an international mobile equipment identity (IMEI), an android advertising ID (AAID), an apple identifier for advertising (IDFA), an MAC address, an IP address, or a cookie information ID.

In step S203, the token generating server 103 may transmit a bid request to the demand side server 105. It is worth noting that the number of demand side server 105 receiving the bid request may be more than one. Moreover, the token generating server 103 may also transmit the bid request to ad networks (not shown on FIG. 2).

In step S205, when the demand side server receives the bid request, it may rely on all the available information from cookie or the data management server to decide to call auction or drop the bid request. For the purpose of privacy protection of the clients, the data obtained from the data management server may not contain any detailed or important data of the clients.

In step S207, when the demand side server 105 accepts the bid request, the demand side server 105 may feedback a bid response corresponding to the bid request along with an ad information to the token generating server 103.

In step S209, the token generating server 103 determines that the ad space 101 goes to the demand side server 105 if the demand side server 105 is the highest bidder, and the token generating server 103 also feedback a winning ad information to the ad space 101.

In step S211, the ad space 101 may request an advertisement creative from the demand side server 105, and in step S213, the demand side server 105 may upload the advertising creative to the ad space 101.

In the embodiment, most of the data obtained from the data management server 107 came from cookie and browsing behaviour, but such information are not sufficient enough to estimate the user profile. Therefore, there is still room for the targeting accuracy improvement.

Figure 3:
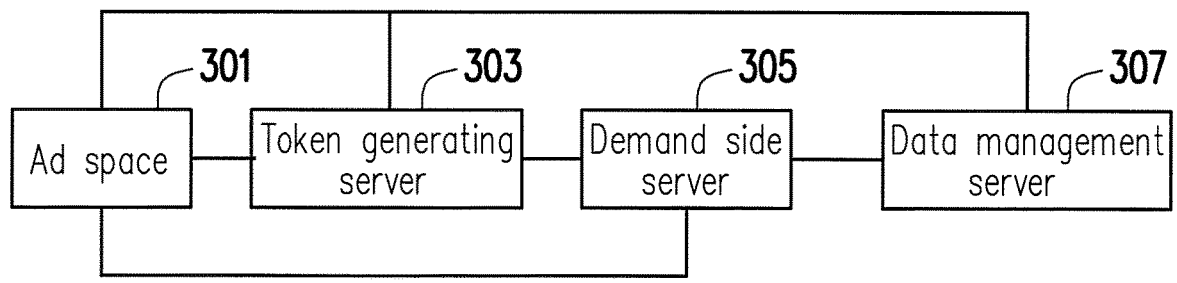
FIG. 3 is a block diagram illustrating a digital advertising bidding system according to another exemplary embodiment of the present invention.

FIG. 3 is a block diagram illustrating a digital advertising bidding system according to another exemplary embodiment of the present invention.

Referring to FIG. 3, the digital advertising bidding system 300 includes an ad space 301, a token generating server 303, a demand side server 305 and a data management server 307. The token generating server 303 couples to the ad space 301 and the demand side server 305, the demand side server 305 couples to the data management server 307 and the ad space 301, and the token generating server 303 couples to the data management server. The ad space 301, the token generating server 303, the demand side server 305 and the data management server 307 are similar to the ad space 101, the token generating server 103, the demand side server 105 and the data management server 107, and therefore detailed explanation is omitted.

Figure 4:
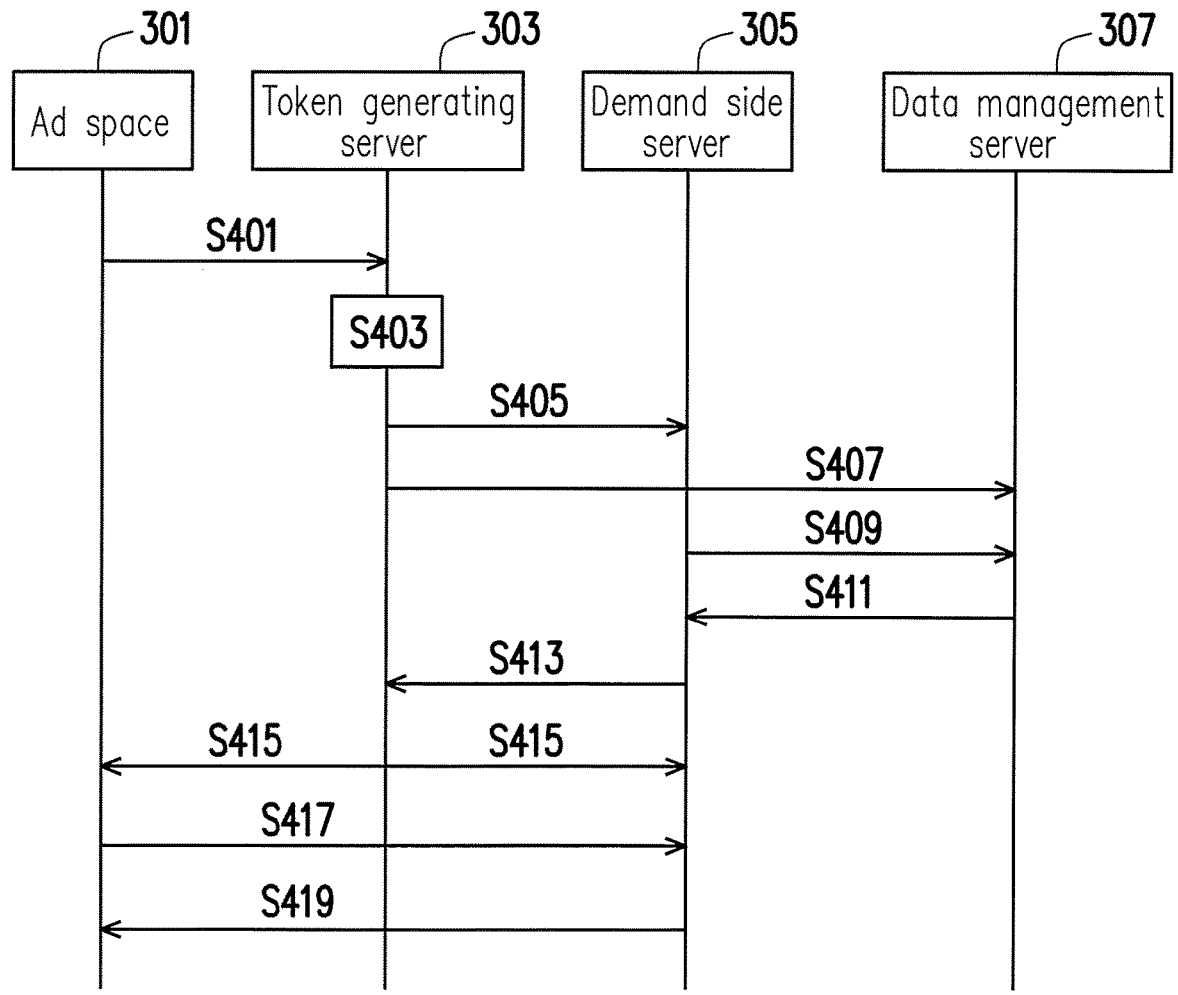
FIG. 4 is a flowchart illustrating a digital advertising bidding method according to another exemplary embodiment of the present invention.

FIG. 4 is a flowchart illustrating a digital advertising bidding method according to another exemplary embodiment of the present invention.

In step S401, a user may have the ad space 301 transmit an ad request with an identifier to the token generating server 303 by utilizing an APP or web browser. The identifier may include an international mobile equipment identity (IMEI), an android advertising ID (AAID), an apple identifier for advertising (IDFA), a MAC address, an IP address, a cookie information ID.

In step S403, the token generating server 303 or ad space 301 may encrypt the identifier to generate a token corresponding to the ad request. Specifically, the token may be a one-time token generated by performing a hashing algorithm (e.g., one-way hashing algorithm) on the identifier and a dynamic information, and the dynamic information may include a system time information or other dynamic information to ensure that the hashed identifier must be different in each bid request, even if the identifier corresponding to the bid request is the same. In an embodiment, the hashing algorithm performed in the token generating server 303 may be a library provided by the data management server 307. However, the present invention is not limited thereto. In another embodiment, the hashing algorithm may be directly called by a software development kit (SDK) stored in the token generating server 303 or the ad space 301.

In step S405, the token generating server 303 may transmit the token and a corresponding bid request to the demand side server 305. It is worth noting that the number of the demand side server 305 receiving the bid request may be more than one, and the token generating server 303 may determine whether the demand side server 305 subscribes the service of user demographic and segmentation information (e.g., user behaviour or interests) from the data management server 307. Furthermore, other information such as a location information, an APP type or an OS type may also be transmitted to the demand side server 305 to facilitate the bidding operation.

In step S407, if the demand side server 305 subscribes the service of user demographic and segmentation information from the data management server 307, the token generating server 303 or the ad space 301 transmits the token and the identifier (i.e., the token-mapping key) to the data management server 305 to make a tokenized bid request. On the other hand, if the demand side server 305 does not subscribe the service of user demographic and segmentation information from the data management server 307, the token generating server 303 may merely transmit the identifier to the demand side server 305 to make a normal bid request.

In step S409, the demand side server 305 may transmit the token to the data management server 307 and request a targeting information corresponding to the token from the data management server 307 after receiving the bid request (e.g., the tokenized bid request).

In step S411, the data management server 307 may transmit the targeting information including more detailed subscriber information to the demand side server 305.

In step S413, the demand side server 105 may feedback a bid response correlated with the targeting information along with an ad information to the token generating server 103.

In step S415, the token generating server 303 determines that the ad space 301 goes to the demand side server 305 if the demand side server 305 is the highest bidder, and the token generating server 303 also feedback a winning ad information to the ad space 301.

In step S417, the ad space 301 may request an advertisement creative from the demand side server 305, and in step S419, the demand side server 305 may upload the advertising creative to the ad space 301.

Figure 5:
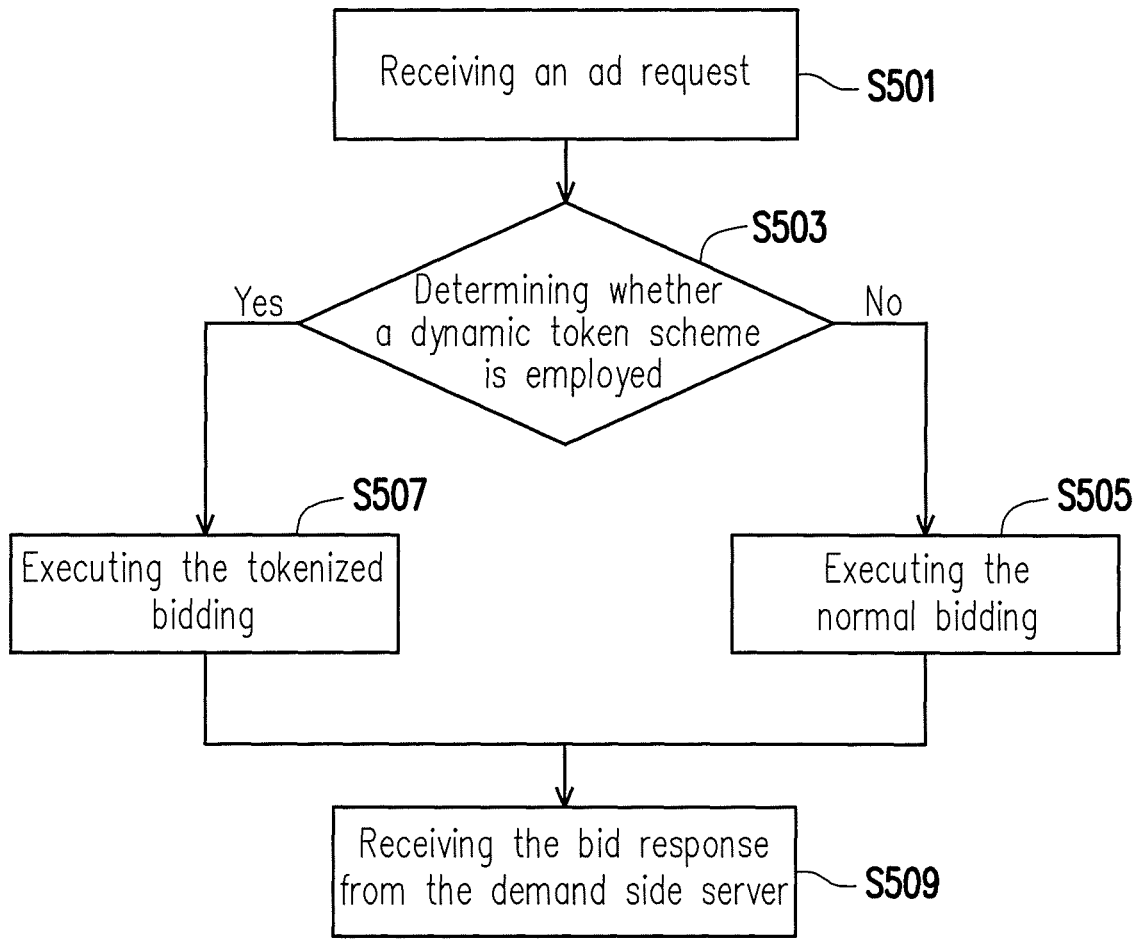
FIG. 5 is a flowchart illustrating a digital advertising bidding method according to another exemplary embodiment of the present invention.

FIG. 5 is a flowchart illustrating a digital advertising bidding method according to another exemplary embodiment of the present invention.

Referring to FIG. 5, in step S501, receiving an ad request by the token generating server 303. In step S503, determining whether a dynamic token scheme is employed. That is, the token generating server 303 determines whether the demand side server 305 subscribes the service of user demographic and segmentation information from the data management server 307. If the demand side server 305 does not subscribe the service of user demographic and segmentation information, in step S505, executing the normal bidding by the demand side server 305. The normal bidding method has been illustrated in FIG. 2, and therefore the detail explanation is omitted. If the demand side server 305 subscribes the service of user demographic information, in step S507, executing the tokenized bidding by the demand side server 305. The tokenized bidding method has been illustrated in FIG. 4, and therefore the detail explanation is omitted. In step S509, receiving the bid response from the demand side server 305 and determining the highest bidder by the token generating server 303.

Figure 6:
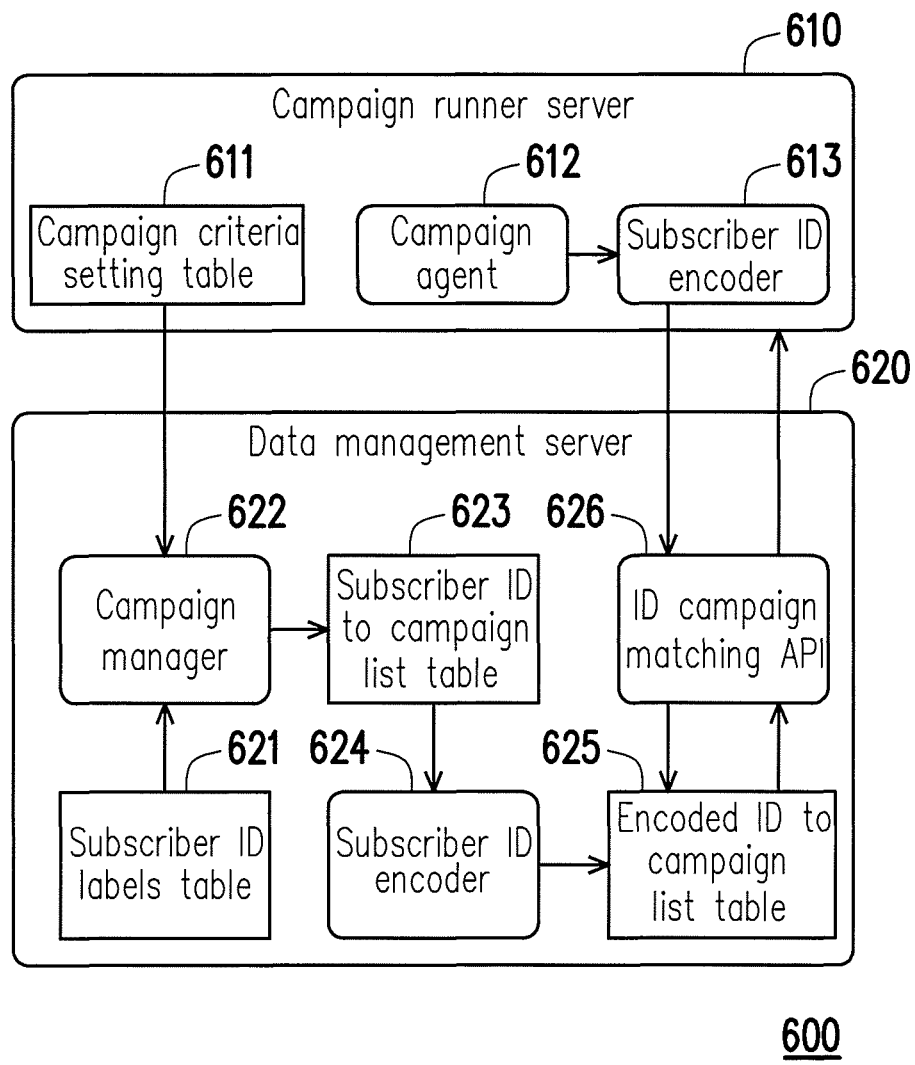
FIG. 6 is a block diagram illustrating a campaign management system based on the digital advertising bidding system according to another exemplary embodiment of the present invention.

FIG. 6 is a block diagram illustrating a campaign management system based on the digital advertising bidding system according to another exemplary embodiment of the present invention.

Referring to FIG. 6, the campaign management system 600 includes a campaign runner server 610 and a data management server 620. The campaign runner server 610 may include a campaign criteria setting table 611, a campaign agent 612 and a subscriber ID encoder 613. The data management server 620 may include a subscriber ID labels table 621, a campaign manager 622, a subscriber ID to campaign list table 623, a subscriber ID encoder 624, an encoded ID to campaign list table 625 and an ID campaign matching API 626. The campaign criteria setting table 611, the subscriber ID labels table 621, the subscriber ID to campaign list table 623 and the encoded ID to campaign list table 625 may be stored in the storage device (e.g., hard drive or solid state drive) of campaign runner server 610 and the data management server 620 respectively. The campaign agent 612, the subscriber ID encoder 613, the campaign manager 622, the subscriber ID encoder 624 and the ID campaign matching API 626 may be software modules of the campaign runner server 610 and the data management server 620.

Specifically, the campaign runner server 610 may register the campaigns with the criteria to the campaign manager 622 from the campaign criteria setting table 611. For example, a criteria of campaign_1 may be (age 25-40, movie lover) and a criteria of campaign_2 may be (female, car lover). Based on the criteria and the subscriber ID labels table, a key-value map may be generated where the key is the subscriber ID and the value is a campaign list including the criteria. For example, the key-value map stored in the subscriber ID to campaign list table 623 may be (subscriber 001: [campaign_1, campaign_2]), (subscriber 002: [campaign_1]), (subscriber 003: [campaign_2]) or (subscriber 004: [ ]). The subscriber ID may then be encoded by the subscriber ID encoder 624 to generate an encoded key-value map stored in the encoded ID to campaign list table 625. For example, the encoded key-value map may be (encoded ID XXX: [campaign_1, campaign_2]) or (encoded ID OOO: [campaign_2]). When the subscriber ID encoder 613 receives a subscriber ID from the campaign agent 612, the subscriber ID encoder 613 generates a corresponding encoded subscriber ID and sends the encoded subscriber ID to the ID campaign matching API 626, and the ID campaign matching API 626 returns the corresponding campaign list to the campaign runner server 610 accordingly. For example, if the subscriber ID encoder 613 sends "OOO" to the ID campaign matching API 626, the ID campaign matching API 626 returns [campaign_2] to the campaign runner server 610 in response.

In summary, the present invention provides a digital advertising bidding method, a digital advertising bidding system and a token generating server that provide a more accurate targeting for digital advertising without releasing any subscriber information to the demand side server because the demand side server merely receives the token and is not able to extract the subscriber information from the token for not having the identifier corresponding to the token. With the privacy information protected, the present invention further utilizes the user demographic information or the location information obtained from the communication service providers to perform a more accurate targeting for each online bid request, and the communication service providers may transform the subscriber information into valuable marketing resources and revenue. Furthermore, the data management server may also be implemented to perform the targeting campaign which returns a campaign list corresponding to an encoded identifier to a campaign agent without exposing subscriber information.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A digital advertising bidding method, comprising:
receiving an ad request with an identifier by a token generating server, wherein the identifier comprises an advertising ID or a cookie ID;
encrypting the identifier to generate a token corresponding to the ad request by the token generating server;
determining, by the token generating server, whether a demand side server subscribes a service of segmentation information from a data management server, wherein the token generating server is coupled to the demand side server and the data management server;

the demand side server subscribing the service of segmentation information from the data management server and a tokenized bidding is executed, wherein the tokenized bidding is executed by the demand side server and the data management server receiving and utilizing the token, wherein the tokenized bidding includes:
  transmitting the token and a tokenized bid request to the demand side server by the token generating server;
  transmitting the token and the identifier to the data management server by the token generating server;
  utilizing, by the demand side server, the token received to request a targeting information corresponding to the token from the data management server; and
  transmitting, by the data management server, the targeting information corresponding to the token received to the demand side server,
the demand side server not subscribing the service of segmentation information from the data management server and the token generating server transmitting the identifier and a bid request to the demand side server to execute a normal bidding,
generating, by the data management server, a key-value map based on a criteria and a subscriber ID labels table, wherein the key is a subscriber ID stored in the subscriber ID labels table and the value is a campaign list including the criteria, wherein a campaign runner server registers campaigns with the criteria to the data management server, wherein the data management server comprises the subscriber ID labels table,
wherein the token generating server is an ad exchange platform, a provider platform or an advertisement network, and the data management server is a communication service provider,
wherein the token is a one-time token generated by performing a one-way hashing algorithm on the identifier and a dynamic information, wherein the dynamic information comprises a system time information or a random generated information, wherein the hashing algorithm performed in the token generating server is a library provided by the data management server, or performed by calling a software development kit stored in the token generating server.

2. The digital advertising bidding method according to claim 1, further comprising:
  transmitting a bid response correlated with the targeting information to the token generating server by the demand side server;
  determining whether the demand side server is a highest bidder by the token generating server; and
  transmitting a winning information to an ad space which transmits the ad request by the token generating server if the demand side server is the highest bidder.

3. The digital advertising bidding method according to claim 2, further comprising:
  requesting an advertisement creative from the demand side server by the ad space; and
  transmitting the advertisement creative to the ad space by the demand side server.

4. The digital advertising bidding method according to claim 1, wherein the identifier comprises an international mobile equipment identity, an android advertising ID, an apple identifier for advertising, a MAC address, an IP address, or a cookie information ID.

5. A digital advertising bidding system, comprising:
  a token generating server;
  a demand side server coupled to the token generating server; and
  a data management server coupled to the demand side server and the token generating server,
  wherein the token generating server receives an ad request with an identifier, wherein the identifier comprises an advertising ID or a cookie ID,
  wherein the token generating server encrypts the identifier to generate a token corresponding to the ad request,
  wherein the token generating server determines whether the demand side server subscribes a service of segmentation information from the data management server;
  wherein the demand side server subscribes the service of segmentation information from the data management server and a tokenized bidding is executed, wherein the tokenized bidding is executed by the demand side server and the data management server receiving and utilizing the token, wherein the tokenized bidding includes:
    the token generating server transmits the token and a tokenized bid request to the demand side server,
    the token generating server transmits the token and the identifier to the data management server,
    the demand side server utilizes the token received to request a targeting information corresponding to the token from the data management server, and
    the data management server transmits the targeting information corresponding to the token received to the demand side server,
  wherein the demand side server does not subscribe the service of segmentation information from the data management server and the token generating server transmits the identifier and a bid request to the demand side server to execute a normal bidding,
  wherein the data management server generates a key-value map based on a criteria and a subscriber ID labels table, wherein the key is a subscriber ID stored in the subscriber ID labels table and the value is a campaign list including the criteria, wherein a campaign runner server registers campaigns with the criteria to the data management server, wherein the data management server comprises the subscriber ID labels table,
  wherein the token generating server is an ad exchange platform, a provider platform or an advertisement network, and the data management server is a communication service provider,
  wherein the token is a one-time token generated by performing a one-way hashing algorithm on the identifier and a dynamic information, wherein the dynamic information comprises a system time information or a random generated information, wherein the hashing algorithm performed in the token generating server is a library provided by the data management server, or performed by calling a software development kit stored in the token generating server.

6. The digital advertising bidding system according to claim 5, wherein the demand side server transmits a bid response correlated with the targeting information to the token generating server,
  wherein the token generating server determines whether the demand side server is a highest bidder,
  wherein the token generating server transmits a winning information to an ad space which transmits the ad request if the demand side server is the highest bidder.

7. The digital advertising bidding system according to claim 6, wherein the ad space requests an advertisement creative from the demand side server, wherein the demand side server transmits the advertisement creative to the ad space.

8. The digital advertising bidding system according to claim 5, wherein the identifier comprises an international mobile equipment identity, an android advertising ID, an apple identifier for advertising, a MAC address, an IP address, or a cookie information ID.

9. A token generating server, coupled to a demand side server and a data management server, wherein the token generating server comprising:

a processor; and a communication chip coupled to the processor, wherein the communication chip receives an ad request with an identifier, wherein the identifier comprises an advertising ID or a cookie ID, wherein the processor encrypts the identifier to generate a token corresponding to the ad request, wherein the processor determines whether the demand side server subscribes a service of segmentation information from the data management server;

wherein the demand side server subscribes the service of segmentation information from the data management server and a tokenized bidding is executed, wherein the tokenized bidding is executed by the demand side server and the data management server receiving and utilizing the token, wherein the tokenized bidding includes:

the communication chip transmits the token and a tokenized bid request to the demand side server, the communication chip transmits the token and the identifier to the data management server, the demand side server utilizes the token received to request a targeting information corresponding to the token from the data management server, the data management server transmits the targeting information corresponding to the token received to the demand side server, and the communication chip receives a bid response correlated with the targeting information from the demand side server, wherein the demand side server does not subscribe the service of segmentation information from the data management server and the communication chip transmits the identifier and a bid request to the demand side server to execute a normal bidding, wherein the processor determines whether the demand side server is a highest bidder, and the communication chip transmits a winning information to an ad space which transmits the ad request if the demand side server is the highest bidder, wherein the token generating server is an ad exchange platform, a provider platform or an advertisement network, and the data management server is a communication service provider, wherein the data management server generates a key-value map based on a criteria and a subscriber ID labels table, wherein the key is a subscriber ID stored in the subscriber ID labels table and the value is a campaign list including the criteria, wherein a campaign runner server registers campaigns with the criteria to the data management server, wherein the data management server comprises the subscriber ID labels table, wherein the token is a one-time token generated by performing a one-way hashing algorithm on the identifier and a dynamic information, wherein the dynamic information comprises a system time information or a random generated information, wherein the hashing algorithm performed in the token generating server is a library provided by the data management server, or performed by calling a software development kit stored in the token generating server.

10. The token generating server according to claim 9, wherein the identifier comprises an international mobile equipment identity, an android advertising ID, an apple identifier for advertising, a MAC address, an IP address, or a cookie information ID.

* * * * *